Aug. 11, 1964  L. G. KAPLAN  3,144,088
COMBINED LIFTING AND WEIGHING DEVICE
Filed April 23, 1962
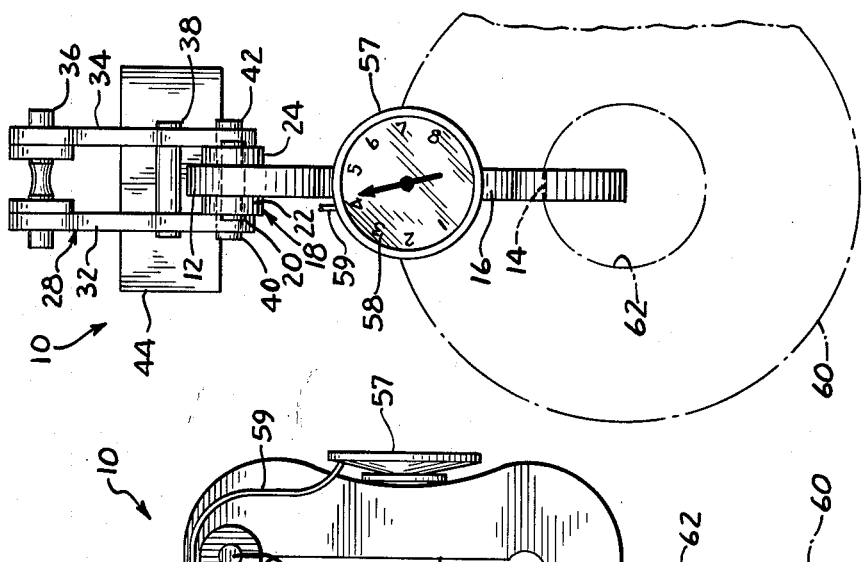
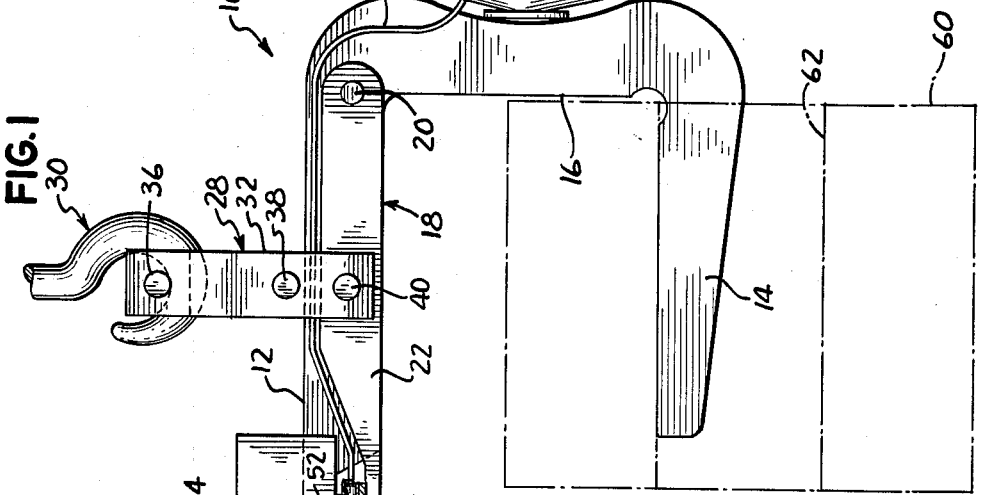
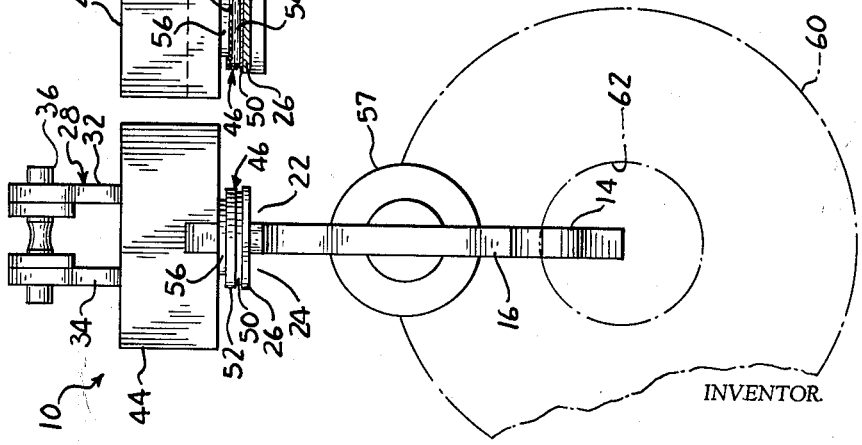
INVENTOR.
Louis G. Kaplan

United States Patent Office 3,144,088
Patented Aug. 11, 1964

3,144,088
COMBINED LIFTING AND WEIGHING DEVICE
Louis G. Kaplan, 306 Darrow St., Evanston, Ill.
Filed Apr. 23, 1962, Ser. No. 189,535
5 Claims. (Cl. 177—147)

The present invention relates to a new and improved device for weighing objects while they are being lifted and transported.

The improved lifting and weighing device comprising the present invention has been designed for use with heavy materials such as metal coils, plates, billets, bundles of sheet metal, pallets and other loads.

Various lifting devices for use in conjunction with overhead hoisting cranes are commonly used for the lifting, transporting and positioning of such loads. When it is desired to obtain the weight of the load while it is being lifted and carried, it is common practice to interpose a weight sensing device such as a spring scale or a hydraulic or electronic load-cell between the crane hook and the lifting device. This arrangement imposes two serious limitations. First, the weight sensing device requires a substantial amount of vertical space or head room. As the lifting height of the overhead hoisting crane is limited by the height of the crane bridge, any vertical distance consumed by the weight sensing device reduces the available storage height, thus resulting in a substantial loss in storage space. In old buildings the crane bridge height is fixed and cannot be readily altered. In a new building, provision for the weight sensing device may be made by constructing the crane bridge at a greater height, but this constitutes an extremely costly expedient. Second, in this type of installation the weight-sensing device is subjected to torsional forces while lifting and transporting the load, particularly if the load must be rotated while being carried. Many types of weight sensing devices are susceptible to damage when subjected to such torsional forces while other types, under this condition will yield incorrect weight readings.

In a few installations, the weight sensing device has been incorporated into the lifting device so as to eliminate or substantially reduce the loss of head room and to remove the torsional forces from the weight sensing device. In such installations great care must be taken to assure that the load being lifted is located accurately in the center of the lifting device or else an erroneous weight reading is obtained.

The present invention is designed to overcome the above-mentioned limitations that are attendant upon the construction and use of the present lifting and weighing devices. It contemplates the provision of a novel form of lifter construction wherein the weighing device is incorporated into the lifter so as to minimize or eliminate the vertical space or head-room required by the weight sensing device. It is a still further object of the invention to provide a weight sensing device installation wherein the weight sensing device is not subjected to torsional forces while lifting, transporting, or rotating the load.

A similar and related object is to provide an installation wherein the true and correct weight will be measured even if the load is not accurately located in the center of the lifter. Another and important object of the invention is to utilize the mass of the weight sensing device to assist in balancing the lifter, thus not only saving costly materials but also reducing the overall weight of the combined devices. This object is of particular importance because the load lifting capacity of the overhead crane is reduced by the weight of the suspended devices.

Yet another object of the invention is to reduce the weight force supported by the weight sensing device, thus facilitating the use of a smaller and less costly weight sensing device.

The provision of a lifter and weighing device of this character which is extremely simple in its construction; one which is comprised of a minimum number of parts and which therefore is unlikely to get out of order; one which is rugged and durable and which therefore will withstand rough usage; one which employs no intricate or special machined parts and which may therefore be manufactured at a relatively low cost; and one which otheriwse is well adapted to perform the services required of it are further desirable features which have been borne in mind in the production and development of the present invention.

With these and other objects in view, which will become more readily apparent as the nature of the invention is better understood, the same consists in the novel construction, combination and arrangement of parts shown in the accompanying sheet of drawings forming a part of this specification.

FIG. 1 is a side elevation view, partly in section of a combined lifting and weighing device assembly constructed in accordance with the principles of the present invention and showing the same operatively suspended from an overhead hoisting crane.

FIG. 2 is a front elevational view of the combined lifting and weighing device assembly shown in FIG. 1; and FIG. 3 is a rear elevational view of the combined lifting and weighing device assembly shown in FIG. 1.

Referring now to the drawings in detail and in particular to FIG. 1, the invention is shown as being applied to a lifter which is in the form of a modified C-hook and having a basic framework which is shaped accordingly. Such a C-hook is adapted for use essentially in lifting and transporting massive coils of sheet metal which are wound in convolute fashion to produce a generally cylindrical body having a central bore therethrough adapted to receive therethrough the lower horizontal leg of the C-hook framework. This illustration is purely exemplary and the invention is applicable to other forms of lifters, as for example lifters having opposed gripping jaws and which are suitable for lifting rectangular or other slabs, billets, stacks of sheet metal and the like. Irrespective however of the particular basic form of lifter to which the present invention is applied, the essential features thereof remain substantially the same.

In the illustrated form of the invention, the lifter framework is of C-shape configuration and it involves in its general organization an upper horizontal member 12, a lower horizontal load-engaging member 14, and an interconnecting vertical bight portion 16. The framework is of integral construction and it may be in the form of a relatively flat plate, which is to say that it is relatively thin in transverse cross section with the two horizontal members and bight portion lying in the same vertical plane. A lever 18, substantially straddles the upper horizontal member and is pivotally connected thereto by means of a pin 20 in proximity to the vertical bight portion 16. The lever 18 consists of two bars 22 and 24 which are connected together at adjacent ends by means of a plate 26. A lifting bail 28 is provided for engagement with the hook 30 of an overhead hoisting crane (not shown) and consists of two vertical plates 32 and 34 and a lifting pin 36 which bridges the distance between the two plates. A cross bar 38 extends between the two vertical plates so as to limit the downward displacement of the bail when the combined lifting and weighing device is disengaged from the crane hook 30.

The lifting bail 28 is pivotally connected to the lever 18 at an intermediate point thereon by means of pivot pins 40 and 42. A counterweight 44 is securely attached to the upper horizontal member 12 so as to balance the combined lifting and weighing device, thus causing the upper and lower horizontal members 12 and 14 to assume a substantially horizontal position when the empty device is suspended from the crane hook 30. The center of gravity of the entire lifting and weighing device is thus located directly below the lifting bail, and a vertical line through the center of gravity will pass through the centerline of both the lifting pin 36 and the pivot pins 40 and 42.

A weight sensing device 46 is interposed between the plate 26 and the upper horizontal member 12 in close proximity to the counterweight 44. Thus when the lifting and weighing device is suspended from the crank hook 30, a portion of its weight is supported by the pivot pin 20 and a portion by the weight sensing device 46.

The relative distribution of the weight between the pivot pin 20 and the weight sensing device 46 is determined by the relative position of the bail pivot pins 40 and 42 along the lever 18. If they are located closer to the pivot pin 20, then this pin will carry the greater portion of the weight, while if they are located closer to the weight sensing device, a major portion will be carried by it.

The weight sensing device 46 is comprised of a shallow cup-shaped cylinder 50, the upper end of which normally is open. A flexible diaphragm 52 extends across the open upper end of the cylinder in sealing relationship and serves to close the same. The cylinder and diaphragm, in combination, provide an internal variable volume hydraulic displacement chamber 54 which is filled with a suitable fluid such as oil. A displacement plunger 56 is fixedly secured to the underneath side of the upper horizontal member 12 and bears downwardly against the diaphragm 52. A pressure indicating device 57 in the form of a conventional pressure gauge having a scale indicator 58 associated therewith is mounted on one side of the vertical bight portion 16 and is operatively connected to the chamber 54 by means of a pressure transmitting conduit 59. In the operation of the weight sensing device, any force or weight which is imposed upon the plunger 56 will flex the diaphragm 52 and cause an increase in the hydraulic fluid pressure within the chamber 54 and this increase in pressure will be transmitted through the tube 59 to the pressure indicating device 57.

A load in the form of a heavy metal coil 60 is shown in broken lines as resting on the lower horizontal member 14 of the lifting and weighing device, with the lower horizontal member projecting into the central opening 62 of the coil. The center of gravity of the coil is in the center of the lifting device and is directly below the lifting bail 28, and a vertical line through the center of gravity passes through the centerline of both the lifting pin 36 and of the bail pins 40 and 42. The weight of the load is supported in fixed proportions by the pivot pin 20 and the load sensing device 46, thus creating a hydraulic pressure within the chamber 54 of the load sensing device and hence in the weight indicator that is proportional to the weight of the coil or load. The weight indicator 57 is calibrated to show the weight of the coil rather than the pressure of the hydraulic fluid. As the lifting bail 28 is pivotally connected to the lever 18, positioning of the load slightly off center causes the lifting and weighing device to hang at a slight incline with the combined center of gravity of the load and the lifting and weighing device directly below and in vertical alignment with the lifting pin 36 and the bail pivot pins 40 and 42. Hence the position of the weight relative to the pivot pin 20 and the load sensing device 46 remains unchanged, and the proportion of the weight supported by each remains unchanged thus, the indication of the weight sensing device remains unchanged, thereby yielding an accurate and correct weight reading.

Since a portion of the weight of the load is supported by the pivot pin 20, the load sensing device 46 is required to support only the remaining portion of the weight, the use of a smaller capacity and lower cost load sensing device is thus facilitated. The load sensing device being in close proximity to the counterweight, serves in itself as an auxiliary counterweight, assisting in balancing the lifting and weighing device. As the load sensing device is in itself of considerable bulk, the size of the counterweight 44 can be considerably reduced resulting in an appreciable saving in materials and an overall reduction in the weight of the combined lifting and weighing device.

While one specific embodiment of the improved lifting and weighing device of the present invention has been shown and described herein for illustrative purposes, it will be understood that the illustrated form of the invention does not by any means indicate all the different forms of apparatus suitable for the functions intended. For example, while the improved weighing and lifting device shown in the accompanying drawing and described in this specification has been designed for use in connection with the lifting and weighing of sheet metal coils, it is within the purview of the invention to embody the principles of the invention in an apparatus for lifting and weighing other objects such as billets, slabs or stacks of sheet metal. In such instances only such modification as will adapt the actual load-engaging structure to the intended load will be required. Therefore, only insofar as the invention has particularly been pointed out in the accompanying claims is the same to be limited.

Having thus described the invention, what I claim and desire to secure by Letters Patent is:

1. A combined lifting and weighing device comprising in combination a framework including an upper member and a lower load-engaging member spaced from and underlying the upper member, a lever having one end pivotally connected to the upper member adjacent one end thereof, a lifting bail designed for connection to an overhead hoist and connected to the lever at an intermediate point thereon, the free end region of said lever normally underlying a portion of the upper member, a weight-sensing device interposed between said upper member and said free end region of the lever and responsive to compressional forces exerted thereon by the free end region of the lever and the upper member when the lifting bail is pulled upwardly, and a weight-indicating device operatively connected to the weight-sensing device for rendering an indication of the degree of compressional force to which the weight-sensing device is subjected when the lifting bail is pulled upwardly, said lifting bail being pivotally connected to the lever to allow for tilting movements of the framework under the influence of different positioning of the load upon the lower member to the end that the downward thrust exerted by the load through the framework upon the point of pivotal connection between the upper member and the lever, and the downward thrust exerted by the load through the framework upon the weight sensing device will remain substantially unaffected by slight variations in positioning of the load on the lower member.

2. A combined lifting and weighing device comprising in combination a framework in the form of a C-hook and including an upper horizontal member, a lower horizontal load-engaging member, and an interconnecting vertical bight portion, a lever having one end pivotally connected to the upper horizontal member adjacent the bight portion and having its free end region underlying the distal portion of the upper horizontal member, a lifting bail designed for connection to an overhead hoisting crane and pivotally connected to the lever at an intermediate point thereon, a weight sensing device interposed between said upper horizontal member and said free end region of the lever and responsive to compressional forces exerted thereon by the free end region of the lever and the upper horizontal member when the lifting bail is pulled upwardly and a weight indicating device operatively connected to the weight sensing device for rendering an indication of the degree of compressional force to which the weight-sensing device is subjected when the lifting bail is pulled upwardly, said intermediate point, which comprises the pivotal connection between the lever and bail, allowing for tilting movement of the framework under the influence of different positioning of the load upon the lower member, to the end that the downward thrust exerted by the load through the framework upon said pivotal connection, and the downward thrust exerted by the load through the framework upon the weight-sensing device, will remain substantially unaffected by slight variations in positioning of the load on the lower member.

3. A combined weighing and lifting device as set forth in claim 2, wherein the weight sensing device is in the form of a variable-volume fluid-containing hydraulic displacement chamber, and a plunger operable against the fluid in the chamber to vary the pressure therein, and wherein the weight indicating device is in the form of a pressure gauge, and a fluid conduit operatively connecting the pressure gauge and displacement chamber.

4. A combined lifting and weighing device as set forth in claim 2, wherein said lifting bail is pivotally connected to the lever to allow for tilting movement of the framework under the influence of different positioning of the load upon the lower member to the end that the downward thrust exerted by the load through the framework upon the point of pivotal connection between the upper horizontal member and the lever, and the downward thrust exerted by the load through the framework upon the weight sensing device will remain substantially unaffected by slight variations in position of the load on the lower horizontal member.

5. A combined lifting and weighing device as set forth in claim 2, including additionally, a counterweight fixedly secured to the distal end of said upper horizontal member in close proximity to the weight sensing device, the counterweight and weight sensing device being so positioned, and their respective weights being such that they will balance the lifting and weighing device causing the upper and lower horizontal members to assume a substantially horizontal position when the empty lifting and weighing device is suspended by said lifting bail.

References Cited in the file of this patent

UNITED STATES PATENTS

| | | |
|---|---|---|
| 1,279,304 | Dysart | Sept. 17, 1918 |
| 1,895,502 | Vernet et al. | Jan. 31, 1933 |
| 1,984,606 | Thomas | Dec. 18, 1934 |
| 2,063,622 | Pfeiffer | Dec. 8, 1936 |
| 2,165,921 | Duda | July 11, 1939 |
| 2,277,925 | MacClatchie et al. | Mar. 31, 1942 |
| 2,298,216 | Lamberger | Oct. 6, 1942 |
| 2,935,213 | Cellitti | May 3, 1960 |
| 2,987,339 | Kaplan | June 6, 1961 |